United States Patent [19]

Williams

[11] Patent Number: 5,584,913
[45] Date of Patent: Dec. 17, 1996

[54] DUST COLLECTOR WITH TWO STAGE SELF-CLEANING OF FILTER ELEMENTS

[75] Inventor: Roger D. Williams, Dallas, N.C.

[73] Assignee: Pneumafil Corporation, Charlotte, N.C.

[21] Appl. No.: 289,850

[22] Filed: Aug. 12, 1994

[51] Int. Cl.⁶ .................................. B01D 33/48
[52] U.S. Cl. .............. 95/280; 55/287; 55/302; 55/403; 55/424
[58] Field of Search .............. 95/277, 279, 280; 55/287, 294, 302, 403, 424

[56] References Cited

U.S. PATENT DOCUMENTS

| | | | |
|---|---|---|---|
| 2,850,112 | 9/1958 | Dru | 55/287 |
| 3,765,152 | 10/1973 | Pausch | 95/279 |
| 3,816,977 | 6/1974 | Gordon et al. | 95/280 |
| 4,067,749 | 1/1978 | McKinney | 95/277 |
| 4,298,361 | 11/1981 | Hocutt et al. | 55/290 |
| 4,655,799 | 4/1987 | Bosworth et al. | 55/287 |
| 5,110,331 | 5/1992 | Williams | 55/302 |
| 5,395,409 | 3/1995 | Klimczak et al. | 55/302 |
| 5,421,846 | 6/1995 | Klimczak | 55/302 |
| 5,458,665 | 10/1995 | Martin et al. | 95/280 |

FOREIGN PATENT DOCUMENTS

| | | |
|---|---|---|
| 2156957 | 5/1973 | Germany. |
| 61-174909 | 8/1986 | Japan. |

*Primary Examiner*—Thomas R. Weber
*Attorney, Agent, or Firm*—Shefte, Pinckney & Sawyer

[57] ABSTRACT

A dust collector for removing foreign matter entrained in a flow of transport air, which includes individual pulse jet cleaners for each of a plurality of filter elements, and a second pulse jet cleaning arrangement that is located centrally of the filter elements, preferably in the form of a conduit extending longitudinally parallel to the axes of the filter elements. The filter elements are rotated past the second pulse jet cleaner to enhance the cleaning of the filter elements.

17 Claims, 4 Drawing Sheets

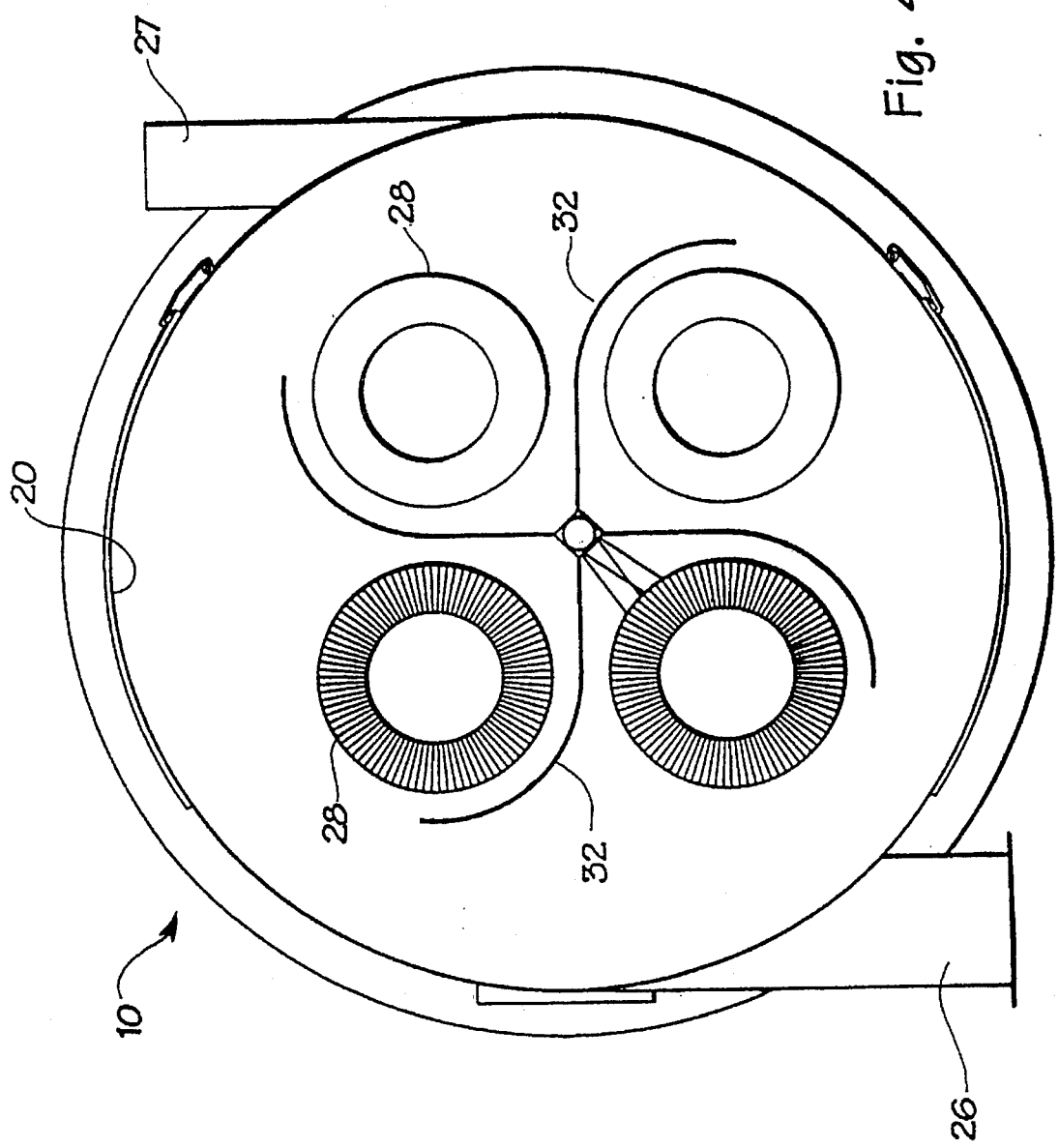

DUST COLLECTOR WITH TWO STAGE SELF-CLEANING OF FILTER ELEMENTS

BACKGROUND OF THE INVENTION

This invention relates generally to dust collectors used in industrial applications and the like to remove particles and other foreign matter which is entrained and carried by a flow of transport fluid, usually air, and more particularly to a dust collector of the type that includes an arrangement for cleaning the filter elements by removing the collected particles and foreign matter therefrom.

As set forth in greater detail in Williams U.S. Pat. No. 5,110,331, the relatively slow rate at which foreign matter can be removed from filter elements in conventional dust collectors utilizing reverse pulse of cleaning air, and the problem of reentrainment of the foreign matter temporarily removed from the surface of the filter elements create a significant limitation in terms of the air-to-cloth ratio (e.g., the ratio of the volume of transport air to the area of the filtering media presented by the filter elements), as well as other related problems. The improved dust collector in the Williams patent significantly reduced the degree of reentrainment of the foreign matter and increased substantially the air-to-cloth ratio of a dust collector of a given size in many industrial applications.

However, in some industrial applications, the presence of entrained foreign matter consisting of both granular-type materials (e.g., granular dust) and more fibrous-type material, such as lint, creates problems for the self-cleaning arrangement in the dust collector, primarily because the reverse pulse jets applied by the self-cleaning apparatus to the filter element obtains excellent results in terms of removing the granular-type foreign matter, but such jets have little effect in removing the more tenacious fibrous-type materials which tend to become more intermeshed with the somewhat roughened surface of the pleated filter media typically used in the filter elements in such dust collectors.

In accordance with the present invention, a unique self-cleaning arrangement is provided which effectively removes both types of foreign matter from the filter element, and the dust collector of the present invention also significantly enhances, in one housing, the quality of the transport air after it has been cleaned and is recirculated back to an environment such as a textile processing mill.

SUMMARY OF THE INVENTION

The present invention relates to a method and apparatus for removing foreign matter entrained and transported in a flow of transport fluid, such as air, which includes a housing having a chamber and inlet for introducing the transport fluid into the chamber and an outlet through which the transport fluid exits after foreign matter has been removed therefrom. The dust collector of the present invention also includes at least one filter element that is mounted in the chamber and formed with a filter material to permit the transport fluid to flow through a surface of the filter element and cause the entrained foreign matter to be removed from the transport fluid and collected on the surface of the filter element. A first filter cleaning device is mounted in the housing to cause a reverse flow of cleaning air to flow back through the filter element in a direction opposite to the normal flow of the transport fluid for causing at least some of the collected foreign matter on the filter material to be moved away from the aforesaid surface thereof and the second filter cleaning device is located adjacent to the aforesaid surface of the filter material and formed to direct a jet of cleaning air toward such surface in a generally downwardly flow path.

Preferably, a plurality of generally cylindrical filter elements are mounted in side-by-side relationship within the chamber and each of the filter elements is rotated within the chamber, with the second filter cleaning device being located along the longitudinal extent of the rotating filter elements to direct a jet of cleaning air along such longitudinal extent as the filter elements rotate therepast. It is also preferable that the first filter cleaning device generate short pulses of cleaning air directed outwardly through the exterior surfaces of the cylindrical filter elements, and, that the second filter cleaning device generates short pulses of cleaning air that are directed downwardly toward the exterior surface of the filter elements.

The second filter cleaning device may include a conduit that extends longitudinally between the plurality of filter elements in a direction generally parallel to the axes thereof, with this conduit being provided with openings formed to emit the aforesaid jet of cleaning fluid in a direction toward the exterior surfaces of the rotating filter elements. Also, in the preferred embodiment of the present invention, the first filter cleaning device and the second filter cleaning device are controlled to generate high velocity pulses in a particular sequence of operation that enhances the cleaning ability of the cleaning devices.

In accordance with a further feature of the present invention, the housing of the dust collector may be provided with an arrangement for humidifying and cooling or heating the transport air after it has been cleaned by the filter elements, whereby the exiting transport air may not require any further conditioning before it is transported through an air recirculation system and into an environment where controlled air is required, such as a textile mill.

BRIEF DESCRIPTION OF THE DRAWINGS

FIG. 4 is a horizontal section view taken along section line 4—4 in FIG. 2;

DESCRIPTION OF THE PREFERRED EMBODIMENT

Figure 1:
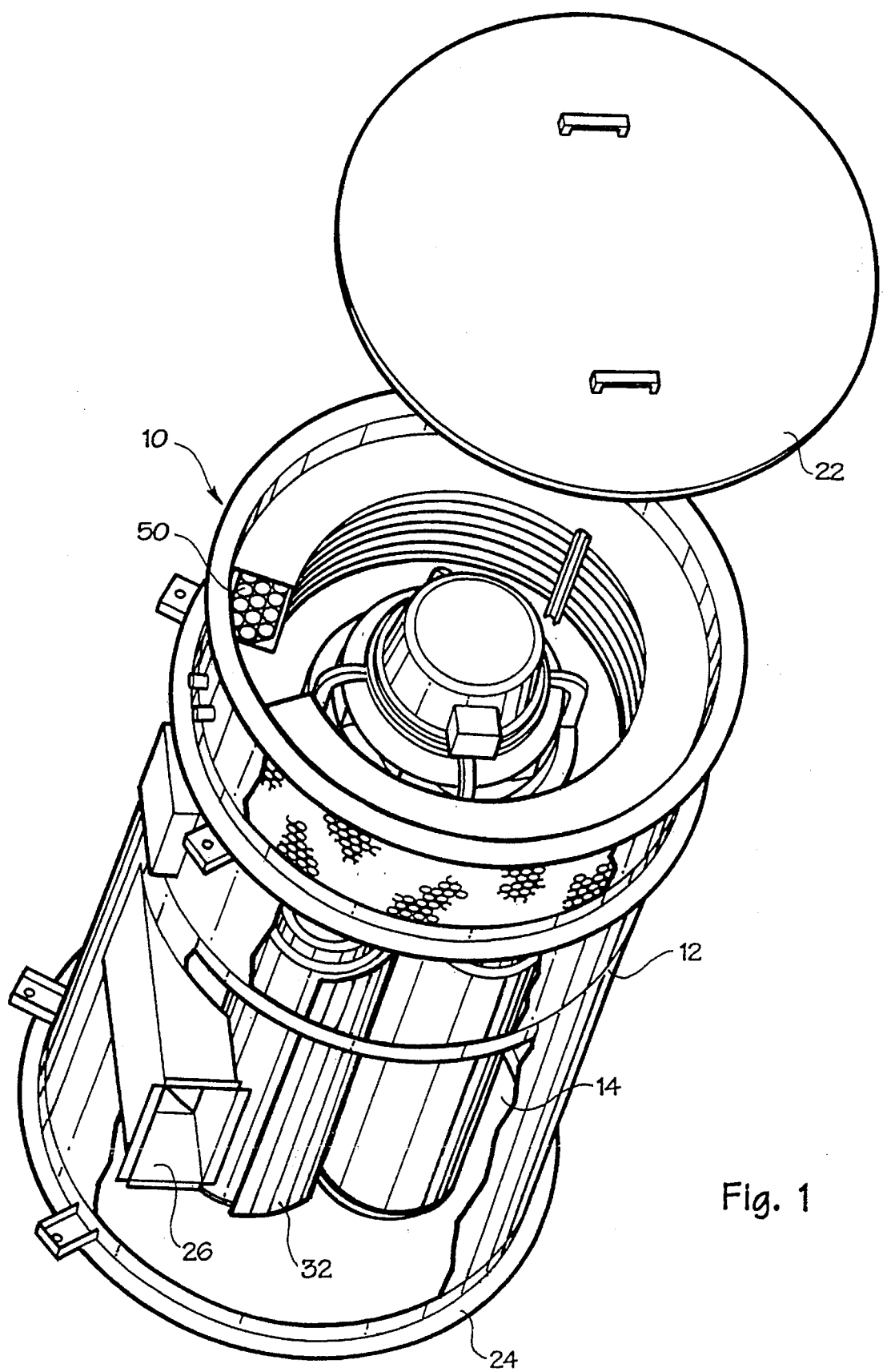
FIG. 1 is a perspective view of a dust collector embodying the present invention, with the top wall of the dust collector removed and with a portion of the housing wall being broken away, all for the purpose of better illustrating the interior portion of the dust collector.
Figure 2:
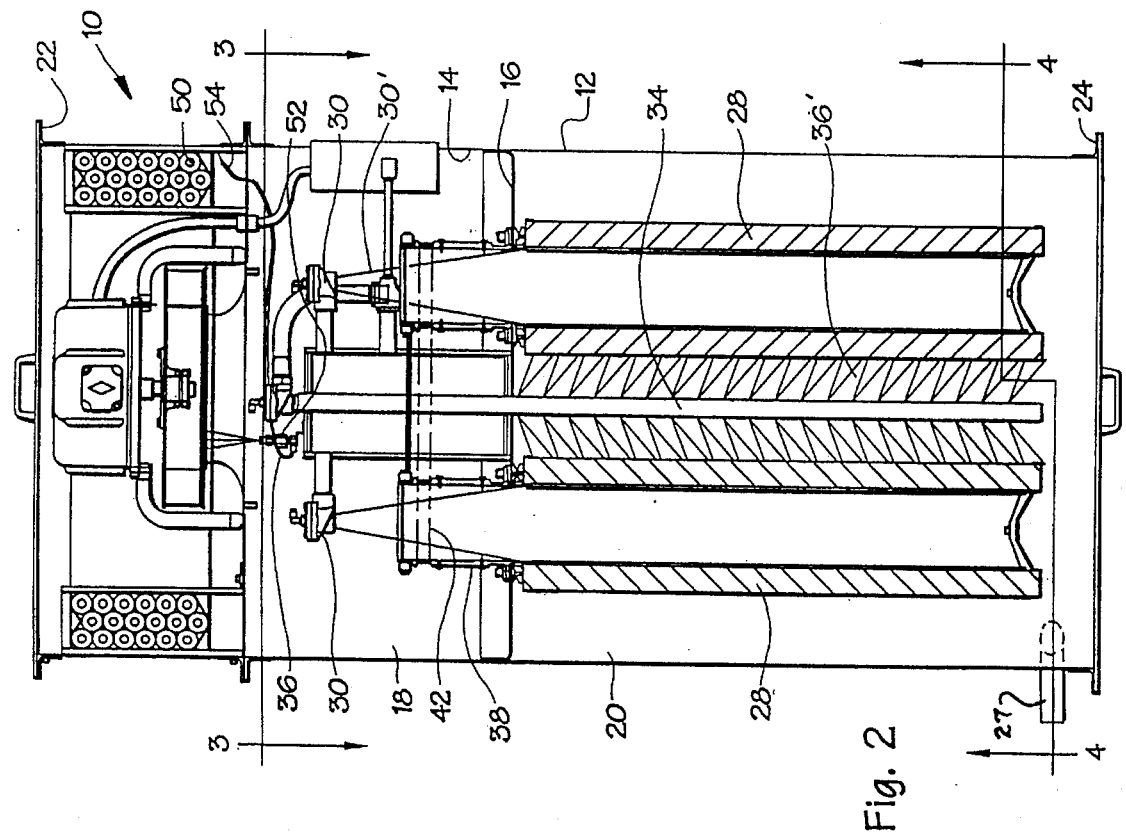
FIG. 2 is a vertical section view taken generally through the center of the dust collector and along section line 2—2 in FIG. 3.

Looking now in greater detail at the accompanying drawings, and particularly FIGS. 1 and 2, the preferred embodiment of the dust collector 10 of the present invention includes a housing 12 forming a chamber 14 that is divided by a generally horizontal partition plate 16 into an upper clean air portion 18 and a lower dirty air portion 20. The housing may also be provided with a removable upper lid element 22 and a removable lower lid 24. Also, the housing 12 is formed with a dirty air inlet conduit 26 which communicates with the lower dirty air portion 20 of the chamber 14 and includes an outlet conduit 27 through which dust particles, lint, or other foreign matter cleaned from the cylindrical filter elements 28 can be removed from the dust collector 10.

As best seen in FIGS. 2 and 4, there are preferably four generally cylindrical filter elements 28, each being formed with a suitable pleated filter material, mounted within the lower chamber portion 20, and each of the filter elements 28 is provided with a separate conventional pulse jet cleaning mechanism or valve 30 which operates in a conventional manner to generate a high pressure pulse of cleaning air 30' which passes into the interior portion of the filter element 28 and creates a pulse of cleaning air back through the filtering material in the filter elements 28 in a direction opposite to the normal flow of the dirty transport air through such material.

As best seen in FIG. 4, each of the filter elements 28 is located adjacent to a generally curved wall portion 32 disposed within the chamber 14 and located with respect to the exterior surface of the adjacent filter element 28 to create therewith a flow channel that causes the reverse pulse of cleaning air discharged through the filter element 28 by the pulse jet valves 30 to flow in a direction towards the helical flow path of the transport fluid within the chamber 14, all in a manner that is described in greater detail in the aforesaid Williams U.S. Pat. No. 5,110,331. For manufacturing convenience, the walls 32 are preferably mounted to a central conduit 34 that extends downwardly through the center of the chamber 14 with a longitudinal extent that is generally parallel to the axes of the filter elements 28. The upper end of the conduit 34 is provided with a conventional pulse jet valve 36, which is similar to the conventional pulse valves 30 and which generates a high pressure pulse of cleaning air when it is energized. The conduit 34 is provided with a plurality of small openings that extend along its longitudinal extent and that are formed in the conduit 34 in such a manner as to cause the pulses of cleaning air generated by the pulse jet valve 36 to be directed toward each of the four filter elements 28 and in a generally downward direction as illustrated by the flow lines 36' shown in FIG. 2.

Figure 6:
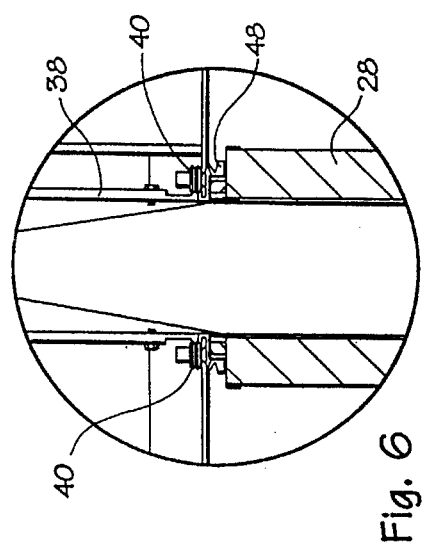
FIG. 6 is a detailed view illustrating the sealing and bearing arrangement for one of the rotating filter elements.
Figure 3:
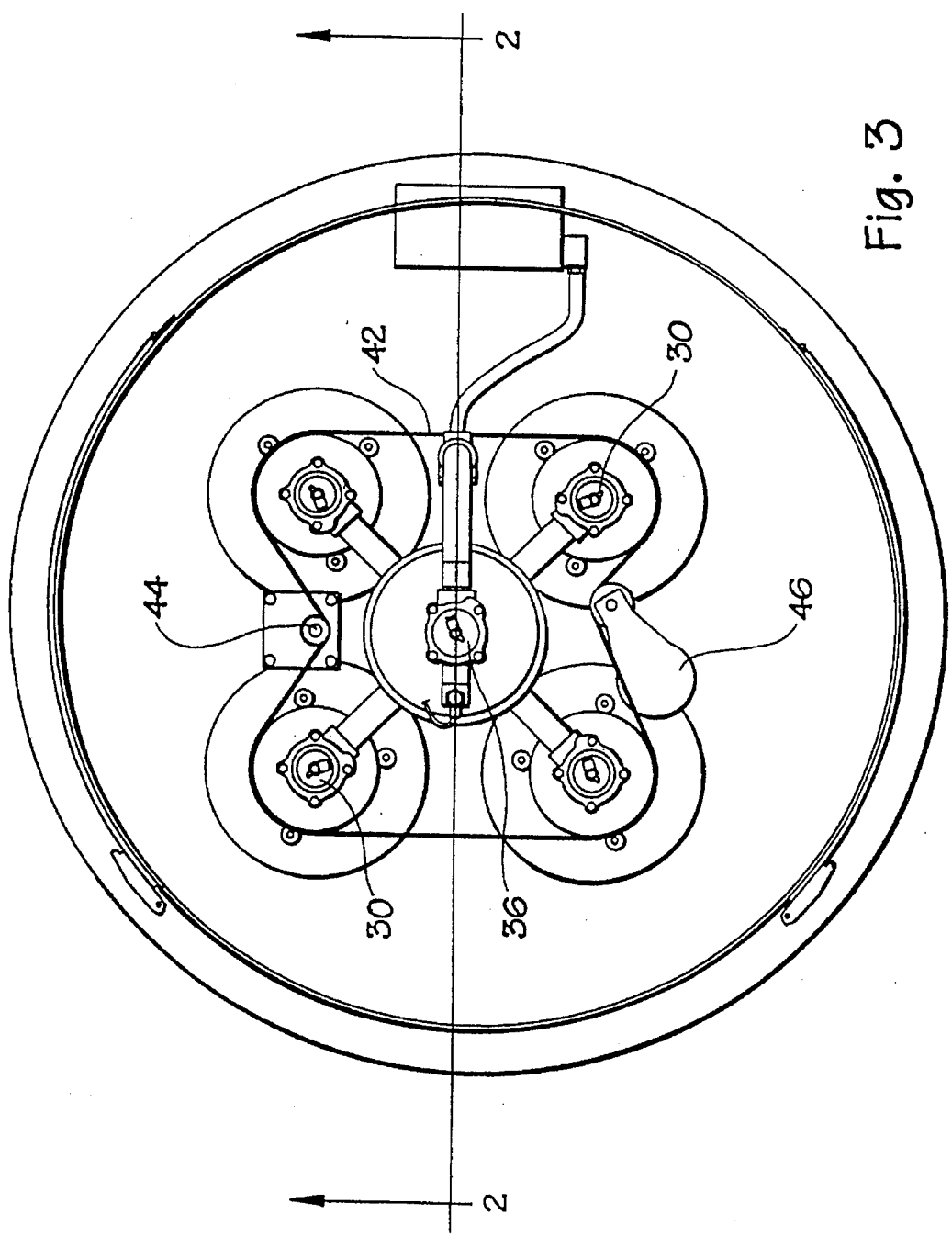
FIG. 3 is an upper plan view taken along section line 3—3 in FIG. 2 and showing the arrangement of the filter elements in the chamber of the dust collector and the rotational drive therefor.

As best seen in FIG. 6, each of the filter elements 28 is provided with an upwardly extending vertical extension 38 that extends through an opening in the partition plate 16 and is rotatably carried in one or more bearings 40 and, as best seen in FIG. 3, the filter elements 28 are rotated by a common timing belt 42 which is engaged by a drive motor 44. A conventional biased tension roll 46 is provided to maintain the generally constant tension in the timing belt 42. Also, each of the filter elements 28 is provided with an annular seal element 48 (see FIG. 6) that extends upwardly to engage the under surface of the partition plate 16 to thereby seal the opening in the partition plate 16 in which the upper extension member 38 passes, so as to prevent or at least reduce any migration of the dirty air in the lower dirty air chamber portion 20 to the upper clean air portion 18.

Figure 5:
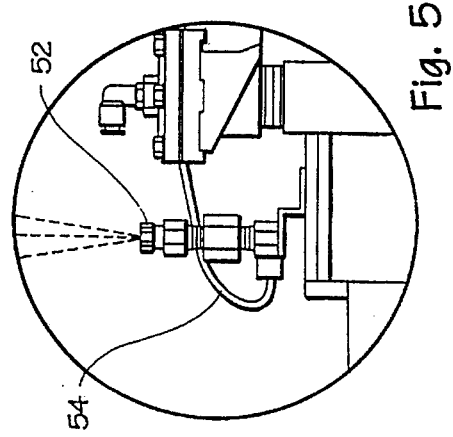
FIG. 5 is a detailed view illustrating the arrangement for humidifying the transport air.

The upper portion of the housing 12 is provided with a plurality of nested annular coils 50 through which a cooling liquid or a heated liquid can be circulated to thereby cool or heat the air in the upper clean air chamber portion 18 before such air leaves the dust collector 10 (see FIG. 2). Air exits dust collector 10 by passing between the annular coils 50 and through a perforated upper wall portion that surrounds the annular coils 50 as illustrated in FIG. 1. Also, a humidifying water nozzle 52 is mounted in the upper clean air chamber portion 18 (see FIGS. 2 and 5), and this nozzle is connected through a water line 54 to any convenient source of water (not shown), whereby a water mist may be introduced into the clean air portion 18 through the nozzle 52 to humidify the cleaned air and the upper chamber portion 18.

In operation, transport air having particles and other foreign matter, such as textile lint, entrained therein is introduced into the lower chamber portion 20 of the dust collector 10 through the inlet 26 under pressure and this dirty transport air flows through the plurality of filter elements 28 from the outside thereof to the interior thereof, thereby depositing particles and foreign matter on the exterior surface of the filter material in the filter elements 28. The cleaned air flows upwardly from the interior of the filter elements 28, through the openings in the partition plate 16, and into the upper portion 18 of the chamber 14. This cleaned air is then humidified by the mist generated through the nozzle 52 that is controlled in any conventional manner to be a function of the total air flow and the desired humidity and, as discussed above, is discharged from the dust collector 10 by passing through the spacings between the coil 50 and out through the perforated upper wall portion of the dust collector 10. The size, number, and location of the coil 50, and the quantity of the cooling or heating fluid passing therethrough, are selected to control the heating and cooling of the transport air as a function of the quantity of transport air being circulated and the desired temperature thereof. Thus, the cleaned air is discharged from the dust collector 10 into the immediate environs thereof, e.g., into a textile mill room, with a desired humidity level and temperature.

In accordance with conventional filter cleaning procedures which are well-known in the art, the pulse jet valves 30 associated with the filter elements 28 are energized in sequence to create a pulse of high pressure cleaning air that passes back through the filter material in the filter elements 28 in a direction opposite to the flow of the transport air and these pulses tend to push particulate and other foreign matter away from the outer surface of the filter elements 28, whereby such foreign matter is ultimately collected in the bottom of the lower chamber portion 20 and removed therefrom through the dust removal outlet 27.

It has been found, however, that some types of foreign matter entrained in the transport air, particularly fibrous material such as lint, does not readily separate from the exterior surface of the filter elements 28 even under the impetus of the pulses generated by the pulse jet valves 30, and it is believed that the fibrous nature of this type of lint tends to cling to the surface of the filter material with greater tenacity than particulate matter.

However, in accordance with one of the significant features of the present invention, the filter elements 28 are continuously rotated by the drive motor 44 so that the exterior surfaces thereof are constantly moving past the center conduit 34. At periodic intervals, preferably at the end of each sequence by which the individual pulse jet valves 30 are energized for the four filter elements 28 as described above, the center pulse jet valve 36 is energized to create a pulse of cleaning air within the center conduit 34, and this pulse manifests itself as a plurality of small jets of cleaning air passing through each of the plurality of openings in the center conduit 34, as indicated by the flow lines 36' in FIG. 2. In the preferred embodiment of the present invention, the openings in the center conduit 34 are drilled into the center conduit at an angle of 60° from the vertical center line of the center conduit 34, and this arrangement of the openings in the center conduit creates a downwardly directed flow of cleaning air that is directed toward the rotating outer surface of the filter elements 28 to drive the foreign matter collected thereon downwardly thereacross.

It has been found that foreign matter that has heretofore been almost impossible to remove from the surface of the filter elements 28 using conventional pulse jets, such as lint and other fibrous-type foreign matter, is effectively removed from the surfaces of the filter elements 28 by the combination of the conventional pulse jet valves 30 and the centrally located pulse jet conduit 34.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A dust collector for removing foreign matter entrained and transported in a flow of transport fluid, said dust collector comprising:

(a) a housing having a chamber, inlet means for introducing the transport fluid into said chamber, and outlet means through which the transport fluid exits said housing after foreign matter has been removed therefrom;

(b) at least one filter element mounted in said chamber and formed with a filter material to permit the transport fluid to flow through a surface of said filter element and cause entrained foreign matter to be removed from the transport fluid and collected on said filter element surface;

(c) first filter cleaning means mounted in said housing to cause a reverse flow of cleaning fluid to flow back through said filter material in a direction opposite to the normal flow of the transport fluid for causing at least some of the collected foreign matter on said filter element surface to be moved away from said filter element surface; and (d) second filter cleaning means located adjacent said filter element surface and formed to direct a jet of cleaning fluid toward said filter element surface in a flow path directed to assist said first filter cleaning means in removing the foreign matter collected on said filter element surface.

2. A dust collector for removing foreign matter according to claim 1 wherein said filter element is generally cylindrical in shape and includes means for rotating it about its axis and wherein said second filter cleaning means is stationary and extends along substantially the entire longitudinal extent of said filter element to direct at least one jet of said cleaning fluid along such longitudinal extent as said rotating means rotates said filter element therepast.

3. A dust collector for removing foreign matter according to claim 2 wherein a plurality of said cylindrical filter elements are mounted for side-by-side rotation within said chamber and wherein said second filter cleaning means is located to direct said jets of cleaning fluid toward all of said filter elements.

4. A dust collector for removing foreign matter according to claim 2 wherein said first filter cleaning means generates short pulses of cleaning fluid directed outwardly toward the exterior surface of said cylindrical filter element, and wherein said second filter cleaning means generates short pulses of cleaning fluid toward said exterior surface of said filter element.

5. A dust collector for removing foreign matter entrained and transported in a flow of transport air, said dust collector comprising:

(a) a housing having a chamber, inlet means for introducing the transport air into said chamber, and an outlet means through which the transport air exits said housing after foreign matter has been removed therefrom;

(b) a plurality of generally cylindrical filter elements mounted in said chamber with their axes being substantially parallel to one another, with the interior surfaces of said filter elements being in direct communication with said housing outlet means and with the exterior surfaces of said filter elements being in direct communication with said housing inlet means, whereby the transport air will normally flow through said filter elements and deposit said foreign matter on said exterior surfaces thereof;

(c) first filter cleaning means mounted in said housing to cause a reverse flow of cleaning air to flow back through said filter elements in a direction opposite to said normal flow of said transport air for causing at least some of the foreign matter to be moved away from said exterior surfaces of said filter elements;

(d) means for rotating said filter elements about their axes at a predetermined speed of rotation; and (e) second filter cleaning means located adjacent said exterior surfaces of said filter elements and formed to direct at least one jet of cleaning air toward said exterior surfaces in a flow path directed to assist said first filter cleaning means in removing the foreign matter collected on said filter element surface where at least some of the foreign matter on said exterior surfaces will be moved downwardly into the bottom of said chamber.

6. A dust collector as defined in claim 5 wherein said second filter cleaning means includes a conduit that extends longitudinally between said plurality of filter elements in a direction generally parallel to the axes thereof, said conduit being provided with openings formed to emit said jets of cleaning air in a direction toward the exterior surfaces of said filter elements.

7. A dust collect as defined in claim 6 wherein there are four coaxially extending filter elements, and wherein said conduit is located centrally of said four filter elements.

8. A dust collector as defined in claim 6 wherein said first filter cleaning means and second filter cleaning means generate high velocity pulses of cleaning air, wherein said first cleaning means generates said pulses for all of said plurality of filter elements in sequence, and wherein said second cleaning means generates its pulses at the end of each said sequences of pulses generated by said first filter cleaning means.

9. A dust collector as defined in claim 5 wherein said housing includes means for humidifying the transport air after it has passed through said filter elements and before it leaves said housing through said outlet means.

10. A dust collector as defined in claim 5 wherein the housing includes means for changing the temperature of said transport air after it has passed through said filter elements and before it leaves said housing through said outlet means.

11. A dust collector as defined in claim 10 wherein said housing includes means for humidifying the transport air after it has passed through said filter elements and before it leaves said housing through said outlet means.

12. A dust collector for removing foreign matter entrained and transported in a flow of transport fluid, said dust collector comprising:

(a) a housing having a chamber, inlet means for introducing said transport air into said chamber, and outlet means through which said transport fluid exits said housing after foreign matter has been removed therefrom;

(b) at least one filter element mounted in said chamber and formed with a filter material to permit said transport air to flow through a surface of said filter element and cause entrained foreign matter to be removed from the transport air and collected on said surface;

(c) filter cleaning means mounted in said housing to cause pulses of cleaning air to be directed toward said filter element to cause at least some of the collected foreign matter on said filter element surface to be removed from said surface of said filter element;

(d) means located in said housing for humidifying said transport air after it has passed through said filter elements and before it leaves said housing through said outlet means, said humidifying means adding a predetermined amount of humidity to the transport air which is a function of the quantity of transport air leaving said housing; and (e) means located in said housing for changing the temperature of the transport air after it has passed through said filter elements and before it leaves said housing through said outlet means, said temperature changing means changing the temperature of said transport air by an amount which is a function of the quantity of transport air leaving said housing.

13. A dust collector as defined in claim 12 wherein said housing chamber includes a dirty air portion in which the transport air with entrained foreign matter is admitted to said chamber, in which said filter elements are disposed, and in which said transport air exits through said filter elements, and wherein said chamber includes a clean air portion in which said humidifying means and said temperature changing means are located.

14. A method of removing foreign matter entrained and transported in a flow of transport fluid, said method comprising the steps of:

(a) passing said transport fluid in a normal flow direction through at least one filter element to cause some of said foreign matter to collect on the surface of said filter element;

(b) passing a first flow of cleaning fluid back through said filter element in a direction opposite to said normal flow of said transport fluid; and (c) directing a second flow of cleaning fluid toward said one surface of said filter element in a direction that is opposite to said direction of flow of said first flow of cleaning fluid and that is angularly offset therefrom.

15. A method for removing foreign matter as defined in claim 14 wherein said filter element is generally cylindrical in shape and wherein said method includes the step of continuously rotating said filter element about its axes while directing said first flow of cleaning fluid toward said interior surface of said filter element and directing said second flow of cleaning fluid toward said exterior surface of said filter element.

16. A method of removing foreign matter as defined in claim 15 and including the step of arranging a plurality of said cylindrical filter elements within a chamber with their axes parallel to one another and directing said second flow of cleaning fluid from a location that is generally centrally located with respect to said plurality of filter elements as they rotate past said location.

17. A method of removing foreign matter as defined in claim 15 wherein said first flow of cleaning fluid is passed through said plurality of filter elements in a predetermined sequence and said second flow of cleaning fluid is directed toward said one surface of each said filter elements substantially simultaneously after said first flow of cleaning fluid has been passed through all of said plurality of filter elements.

* * * * *